UNITED STATES PATENT OFFICE.

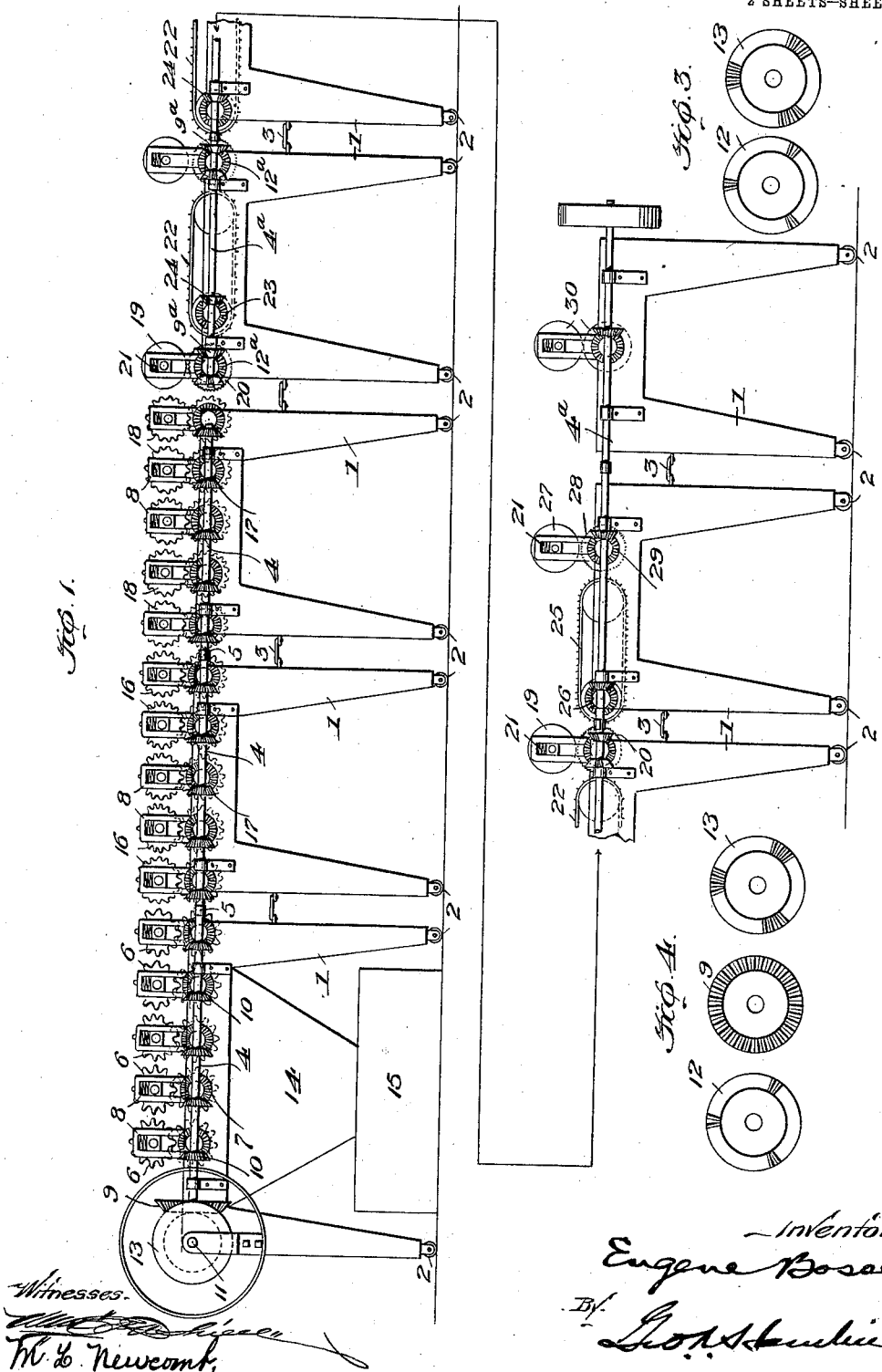

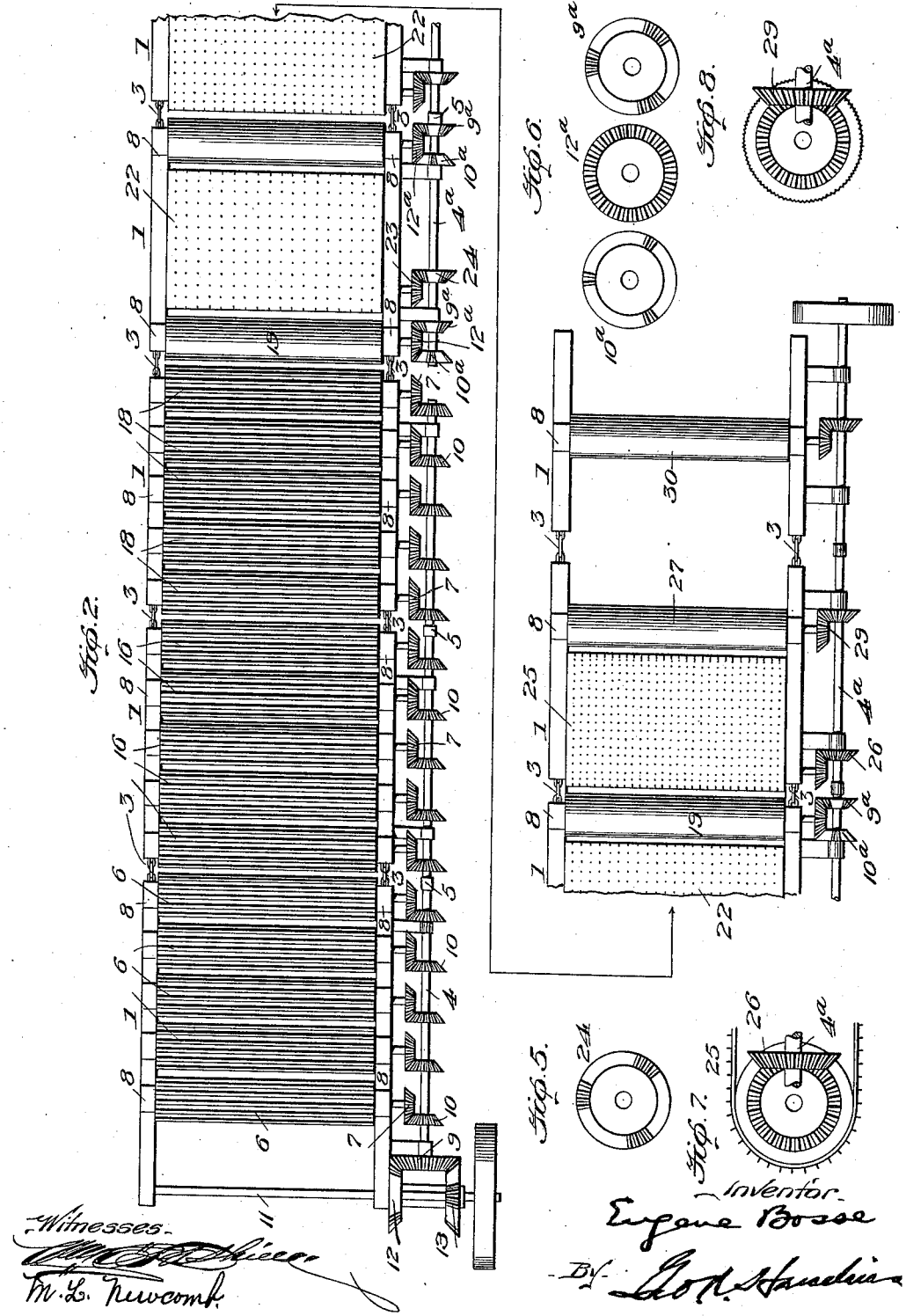

EUGENE BOSSE, OF SALEM, OREGON.

MACHINE FOR TREATING FLAX AND OTHER FIBER-YIELDING PLANTS.

1,001,925. Specification of Letters Patent. Patented Aug. 29, 1911.

Application filed August 8, 1910. Serial No. 576,246.

*To all whom it may concern:*

Be it known that I, EUGENE BOSSE, a citizen of the United States, residing at Salem, county of Marion, and State of Oregon, have invented certain new and useful Improvements in Machines for Treating Flax and other Fiber-Yielding Plants, of which the following is a specification.

My invention relates to machines for treating flax and other fiber yielding plants.

The object of the present invention is the provision of a machine of improved and novel construction adapted for carrying on the entire process, or such steps thereof as are necessary to accomplish the desired degree or extent of treatment, of treating green flax fiber from its original unthreshed and unretted condition to its finished condition strong enough for the manufacture of binder and other coarse twines and cordage, and to this end the invention seeks to provide a machine of novel construction, preferably arranged in detachable units or sections, capable of association to carry out the complete process or adapted for independent use to carry on any part thereof, which will thresh, decorticate and refine the raw flax straw so as to condition it for use as twine or cordage.

The invention embraces a thresher or crusher, a decorticator, and a refining or hackling mechanism, all of novel construction, and novel operating mechanism, whereby the threshing, decorticating and hackling rollers which are employed, are given alternate advance and retrograde movements, the former of greater amplitude than the latter, and the gills of the hackling mechanism are made to advance with the advance rollers of said hackling mechanism, but stop on the retrograde movement thereof, but the invention also contemplates the provision of another novel arrangement of gills and rollers whereby a final gentle drawing action is exerted on the refined flax to insure the removal of any impurities which have not been previously eliminated, thus affording a superior preliminary and final treatment of the fiber.

*The thresher or crusher.*—A fact not generally appreciated by those skilled in this art is that the green flax straws must be separated from the fiber without injury to the latter and with the least possible damage and waste in short fibers and must be worked gradually and gently. The straw should be flattened, the woody center or "shive" of the flax crushed, and both detached from the fiber or part surrounding the woody center. The gummy substance in the flax makes the straw brittle and would render it subject to breakage and tearing of the fiber, and hence the initial treatment of the flax should be neither too sharp nor too prolonged. My thresher is designed to satisfactorily flatten the straws, crush the woody part or "shive" and suitably free the "shive" and seeds from the straw without injury to the fiber, the freed parts falling off and being suitably caught in a receptacle, if desired. The thresher comprises coarsely corrugated rollers arranged in a novel manner, through which the flax straw is passed and which, by reason of the alternate advancing and retrograde movements of the rollers, is freed of the undesirable parts, as set forth.

*The decorticator.*—In the treatment of flax it is necessary that the fiber be perfectly clean, or at least that all of the woody part or "shive" be detached from the fiber before undergoing the process of refining, because if the points of the pins or "gills" of the refining mechanism encounter any particle of "shive" adhering or sticking to the fiber, there is a greater likelihood of tearing and breaking the filament than of the freeing of the adhering particles therefrom. The decorticating mechanism which I have invented, consists of corrugated rollers arranged in two sets, the flutes or corrugations of which are finer than those of the threshing mechanism and those of one set of rollers are finer than those of the preceding set. These decorticating rollers further open up the fiber and relieve it of any particles adhering thereto so that when it is presented to the hackling mechanism, it is sufficiently free of adhering particles to enable the hackling mechanism to so treat it that a very satisfactory fiber for use as binder or other coarse twines or cordage can be produced by the machine.

The hackling or refining mechanism embraces rollers and movable gills, the former having an alternating advancing and retrograding movement the same as imparted to the threshing and decorticating rollers, and the latter being adapted to intermittently advance, but without retrogression. Thus, on the retrograde rotation of the rollers, the advance of the gills ceases but is resumed upon the resumption of the advance of the rotation of the rollers. The stoppage of the gills during the retrogression of movement of the rollers imparts a superior hackling action to the fiber. This action of the rollers and gills is accomplished by novel gearing which is, in part, similar to the mechanism employed for alternately advancing and causing retrogression of rotation of the threshing and decorticating rollers. I also utilize final hackling mechanism which consists of rollers rotating continuously forward faster than those which precede it, together with continuously advancing gills which gently draw the refined flax and insure the removal of any impurities which have escaped previous elimination.

Having generally described the different parts of the invention, reference for the details thereof is to be made to the following specification, and, for the novel features to the appended claims, while the invention is disclosed in the accompanying drawings, in which—

Figure 1 is a side elevation; Fig. 2, a plan view; Fig. 3, a detail of the two mutilated bevel gears which alternately advance and retreat the crushing and decorticating rollers; Fig. 4, a detail view of the complete gearing for operating the crushing and decorticating rollers; Fig. 5, a detail view of the mutilated bevel gear which operates all but the final set of gills; Fig. 6, a detail view of the complete gearing for driving all but the final set of the rollers of the hacking or refining mechanism; Fig. 7, a detail of the gearing which continuously advances the final gill; and Fig. 8, a detail of the gearing which rotates the final hackling roller.

The various sections of the machine each have a suitable frame-work 1, suitable rollers 2 being provided for the frames in order that they may be readily moved about or substituted for another section when desired, and connecting devices 3 are used for detachably connecting the frames together. Each frame is provided with a suitably journaled power shaft 4, all of the said shafts being at the same height and provided with detachable shaft couplings 5, whereby they are interchangeably coupled together, except in the case of the frame carrying the hackling mechanism, whose power shaft 4ª is separately driven.

The thresher is composed of the corrugated rollers 6 of suitable diameter and length, consisting of pairs or sets whose corrugations intermesh, the respective sets being located so that the fiber is fed from the rollers of one set to those of the next set. The corrugations of these rollers are rounded and are sufficiently large so as to open up the fiber and perform the functions heretofore ascribed to them. The lowermost of the rollers are driven from the shaft 4 by ordinary bevel gears 7 and the uppermost rollers rest upon the lowermost ones by their own weight and are journaled in the upright frame pieces 8 to slide vertically thereon so that they accommodate themselves to the thickness of the flax fiber passing between them.

On shaft 4 are bevel gears 9 and 10. On a countershaft 11, driven by any suitable means, are gears 12 and 13 (Figs. 3 and 4) which are mutilated, each having three gear segments, but each gear segment of gear 13 has double the number of teeth or cogs of any gear segment of gear 12, and the gear segments of the gears 12 and 13 are each set opposite the mutilated parts of the other of said gears. When the gear 12 is in mesh with the gear 9, the gear 13 is out of mesh with gear 10, and vice versa. The gears 12 and 13 are so placed that the rollers 6 are given an oscillatory movement, but their forward movement is twice as great as their backward movement, so that they are intermittently advancing all the time.

Below the thresher is a hopper 14 leading to a fanning mill 15 by which the detached parts of the fiber are received and blown away.

The decorticating rollers, which are shown at 16, are constructed and arranged in all respects similar to the threshing rollers 6 and are driven from shaft 4 by sets of bevel gears 17, but these rollers have their corrugations somewhat smaller than the corrugations of the rollers 6 and, the decorticating rollers 18, which are constructed, arranged and driven as before set forth, have still finer corrugations, and consequently, those objectionable parts of the fiber which have not been removed by the threshing rollers 6 are removed by the rollers 16, but if not removed by said latter rollers, they are finally removed by the corrugations of the rollers 18, and hence the slivers of flax issuing from the final pair of rollers 18, are sufficiently freed from the objectionable "shives" or seeds so that they may be hackled and after hackling be in a condition rendering them suitable for use in the manufacture of coarse or binder twine or cordage.

The hackling mechanism has sets of rollers, the uppermost ones 19, of which are smooth and held down on the lower rollers 20 by springs 21 to prevent slipping of the fiber when drawn back on the gills 22. The lower rollers 20 are preferably provided with fine corrugations which, by their engagement with the flax fiber, prevent this backward slipping. The gills 22 may be either rotary or of the endless chain type, the latter being the kind shown in the present instance. As many sets of rollers and gills may be employed, successively finer, as desired. The rollers 20, and through them, the rollers 19, are driven to alternately advance and retreat the flax fiber, but with an ultimate advancing movement, by the utilization of gearing 9ª and 10ª, adapted to engage a bevel gear 12ª, constructed and operating in the manner heretofore set forth (Fig. 6). The shaft of the gill is, however, provided with a bevel gear 23, and on the shaft 4ª there is provided a mutilated bevel gear 24 adapted to mesh therewith which is of the same construction as the gear 10ª (Fig. 5) and is set on the shaft with its cogs or teeth and mutilated or blank spaces in line with corresponding parts of the gear 10 so that the endless gill 22 will, during the advance movement of the rollers 20, be advanced and during the retrograde movement of the rollers 20 caused by the engagement of the gear 9ª therewith, stopped, the gill remaining stationary, on account of a blank or mutilated portion of the gear 24 being next the gear 23 during the engagement of the gear 9ª with the gear 12ª which turns rollers 20. Thus, the gill remains stationary to perform a hackling action on the fiber as it is being drawn backward by the reversing rotation of the rollers 20.

The advance rotations of the rollers 6, 16, 18 and 20, all occur at the same time and to the same extent, and the reverse motions of these rollers occur simultaneously, but the gill 22 remains stationary during such reverse rotation.

The final gill 25 which is the finest of all, is continuously rotated forwardly by the bevel gearing 26 (Fig. 7) at the same speed as that of the advance of the gills 22, but the gill 25 at no time stops. The final rollers 27, 28 are rotated continuously forwardly faster than the advance rotation of the rollers 19, 20, by the bevel gearing 29 (Fig. 8), said rollers 27, 28 and gill 25 exerting a gentle drawing action on the refined flax and insuring the elimination of any impurities which may remain therein. Condensing and narrowing rollers 30 form the final sliver of flax into proper size, ready for use in the manufacture of binder or coarse twine or other cordage.

Having thus described my invention, what I claim as new and desire to secure by Letters Patent, is:—

1. In a machine for treating flax and other fiber yielding plants, refining or hackling mechanism consisting of rollers to feed the sliver of flax, gills disposed adjacent said rollers and adapted for passage of a sliver of flax thereover and for hackling said sliver, means for rotating said rollers both forwardly and rearwardly, and means for continuously advancing said gills during the forward movement of the rollers and stopping them during the rearward rotation of said rollers.

2. In a machine for treating flax and other fiber yielding plants, refining or hackling mechanism consisting of rollers to feed the sliver of flax, gills disposed adjacent said rollers and adapted for passage of a sliver of flax thereover and for hackling said sliver, means for rotating said rollers both forwardly and rearwardly, the forward rotation being of greater amplitude than the rearward rotation, and means for continuously advancing said gills during the forward movement of the rollers at the same rate of progression as said rollers and for stopping said gills during the rearward rotation of said rollers.

3. In a machine for treating flax and other fiber yielding plants, refining or hackling mechanism consisting of rollers to feed the sliver of flax, gills disposed adjacent said rollers and adapted for passage of a sliver of flax thereover and for hackling said sliver, means for rotating said rollers both forwardly and rearwardly, means for continuously advancing said gills during the forward movement of the rollers and stopping them during the rearward rotation of said rollers, and final gills and rollers which continuously advance without retrogression for refining the flax.

4. In a machine for treating flax and other fiber yielding plants, refining or hackling mechanism consisting of rollers to feed the sliver of flax, gills disposed adjacent said rollers and adapted for passage of a sliver of flax thereover and for hackling said sliver, means for rotating said rollers both forwardly and rearwardly, the forward rotation being of greater amplitude than the rearward rotation, means for continuously advancing said gills during the forward movement of the rollers at the same rate of progression as said rollers and for stopping said gills during the rearward rotation of said rollers, final gills which continuously advance without retrogression, and final continuously advancing rollers which rotate faster than do the rollers aforesaid during their advance movements.

In testimony whereof, I hereunto affix my signature in presence of two witnesses.

EUGENE BOSSE.

Witnesses:
C. E. THOMPSON,
C. N. THOMPSON.

---

Copies of this patent may be obtained for five cents each, by addressing the "Commissioner of Patents, Washington, D. C."